United States Patent [19]

Sauerwein

[11] Patent Number: 4,898,604
[45] Date of Patent: Feb. 6, 1990

[54] METHOD OF MANUFACTURING A BLANK FOR A LIGHT-WEIGHT MIRROR WITH A SUPPORTING STRUCTURE

[75] Inventor: Paul Sauerwein, Rodenbach, Fed. Rep. of Germany

[73] Assignee: Heraeus Quarzschmelze GmbH, Hanau, Fed. Rep. of Germany

[21] Appl. No.: 165,447

[22] Filed: Mar. 1, 1988

Related U.S. Application Data

[63] Continuation of Ser. No. 841,915, Mar. 20, 1986, abandoned.

[30] Foreign Application Priority Data

Mar. 22, 1985 [DE] Fed. Rep. of Germany ....... 3510414

[51] Int. Cl.$^4$ ............................................. C03B 23/207
[52] U.S. Cl. ...................................... 65/18.1; 65/184; 65/36; 65/42; 65/60.5; 65/60.8; 65/144; 264/2.3; 264/109; 264/DIG. 53; 350/320
[58] Field of Search ................. 65/18.1, 18.4, 32, 36, 65/42, 43, 58, 144, 60.5, 60.8; 264/2.3, 2.5, 109, 110, DIG. 53; 350/320

[56] References Cited

U.S. PATENT DOCUMENTS

| | | | |
|---|---|---|---|
| 3,467,511 | 9/1969 | George | 65/36 |
| 3,739,455 | 6/1973 | Alvarez | 264/2.5 |
| 4,020,896 | 5/1977 | Mold et al. | 65/43 |
| 4,331,383 | 5/1982 | Christiansen | 65/36 |
| 4,408,833 | 10/1983 | Gowan | 350/320 |
| 4,466,700 | 8/1984 | Christiansen et al. | 350/320 |
| 4,606,960 | 8/1986 | Angel et al. | 65/36 |

FOREIGN PATENT DOCUMENTS

| | | | |
|---|---|---|---|
| 739458 | 6/1980 | U.S.S.R. | 350/320 |
| 0968025 | 8/1964 | United Kingdom . | |

Primary Examiner—David L. Lacey
Assistant Examiner—L. Johnson
Attorney, Agent, or Firm—Sprung Horn Kramer & Woods

[57] ABSTRACT

A method of manufacturing a blank for a light-weight mirror. Graphite molding bodies are positioned at regular intervals on a base that functions as a mirror plate or backing plate. The base is surrounded up to the top of the molding bodies with a graphite wall. The interstices between the molding bodies and between the wall and the molding bodies are filled with granular quartz. The assembly is heated in an evacuated furnace to approximately 1730° C. into a honeycomb-shaped supporting structure that is securely fastened to the base. The graphite molding bodies and wall are removed after cooling. Either a backing plate or a mirror plate in the form of another plate is applied to the resulting supporting structure.

8 Claims, 2 Drawing Sheets

METHOD OF MANUFACTURING A BLANK FOR A LIGHT-WEIGHT MIRROR WITH A SUPPORTING STRUCTURE

This application is a continuation, of application Ser. No. 841,915, filed 3/20/86 now abandoned.

BACKGROUND OF THE INVENTION

The present invention relates to a method of manufacturing a blank for a light-weight mirror with a supporting structure that has cells and that can be fastened securely to a mirror plate or backing plate, whereby the materials selected for the supporting structure and for the mirror plate or backing plate have practically the same coefficient of thermal expansion and whereby the supporting structure is manufactured by positioning mutually separated graphite molding bodies on a base in the form of a plate, surrounding them with a wall of graphite, filling the interstices between the molding bodies and between the molding bodies and the wall with a granulate of crystalline or amorphous quartz to create part of the supporting structure, placing the overall assembly in a furnace where it is baked in a non-oxidizing atmosphere, and removing the graphite molding bodies once the piece has cooled.

U.S. Pat. No. 4 466 700 discloses a method of manufacturing a light-weight mirror, especially for applications in astronomy. A prefabricated supporting structure of quartz glass, fused quartz, or high-silicate glass is positioned between a front plate made out of quartz glass or high-silicate glass and a backing plate of quartz glass, fused quartz, or high-silicate glass and securely fastened to the plates. The materials selected for the plates and supporting structure have practically the same coefficient of thermal expansion. The supporting structure is created by placing plate-shaped and/or tubular pieces of quartz glass, fused quartz, or high-silicate glass on a supporting plate coated with a material, graphite for example, that contains carbon, filling the interstices between each pair of adjacent pieces with a sintering mass of granulate, small tubelets, rods, or flakes, or a mixture thereof, surrounding the assembly with an annular wall of graphite, and baking it in a furnace in a non-oxidizing atmosphere for 2 to 6 hours at a temperature of from 1300° to 1600° C. The plate and wall are then removed once the piece has cooled. Molding bodies made out o a material that contains carbon or graphite can also be positioned on the supporting plate and removed along with it. The baking sinters the particles of quartz not only together but also to the tubular pieces. Once the graphite pieces have been removed, the supporting structure is fastened to the front plate and backing plate by oriented thermal action such as arc fusing for example.

The method disclosed in that patent accordingly necessitates positioning a number of prefabricated tubular pieces of quartz material on the supporting plate and packing them with granulated material in order to obtain the desired honeycomb structure subsequent to sintering. Since the space taken up by the granulate can be considerably reduced by introducing graphite molding bodies, only a comparatively small amount of space needs to be filled to attain high stability. Still, the method is relatively expensive. The tubes of quartz material that function as a starting material must be prefabricated in a series of stages, assembled onto a base for the supporting structure, the interstices filled with granulate, and sintered together into a structure. Furthermore, arc fusing the supporting structure to the front plate and backing plate involves still a third step, and the resulting incomplete heating can cause considerable stress to the detriment of stability.

SUMMARY OF THE INVENTION

The object of the present invention is to provide a method of manufacture that is as cost effective as possible, avoids stresses in the material, eliminates the need for special prefabricated parts of quartz material, and allows a supporting structure of any desired molding body. Furthermore, there will be no need to add fluxes of any kind.

This object is attained in accordance with the invention in a method of the aforesaid type for manufacturing a blank for a light-weight mirror, wherein the graphite molding bodies are positioned directly on the mirror plate or backing plate, which acts as a base, the supporting structure is created completely out of the granulate packed into the interstices, the resulting assembly is heated for 2 to 6 hours in a furnace under a pressure of $2 \times 10^{-2}$ to 2 mbars at a temperature of 1710° to 1780° C., and the resultingly bonded assembly is cooled within the furnace.

In one preferred embodiment of the method the assembly can be heated to a temperature of 1720° to 1740° C.

Pieces of graphite or graphite sheeting can be employed for the molding bodies, and the granulate can have a particle size of approximately 300 $\mu$m. They can be fused in the furnace under a vacuum of $2 \times 10^{-2}$ mbars.

The furnace can be flooded with an inert gas subsequent to the termination of heating. The inert gas can be nitrogen.

The particular advantage of the invention is that the supporting structure is produced and fastened to the front plate or backing plate in a single step, whereas the particular design of the structure can varied by varying the shape, size, and position of the graphite molding bodies. The starting material for the supporting structure is granulated quartz glass or fused quartz.

Some preferred embodiments of the invention will now be described with reference to the attached drawings, wherein:

DETAILED DESCRIPTION OF THE INVENTION

Figure 1A:
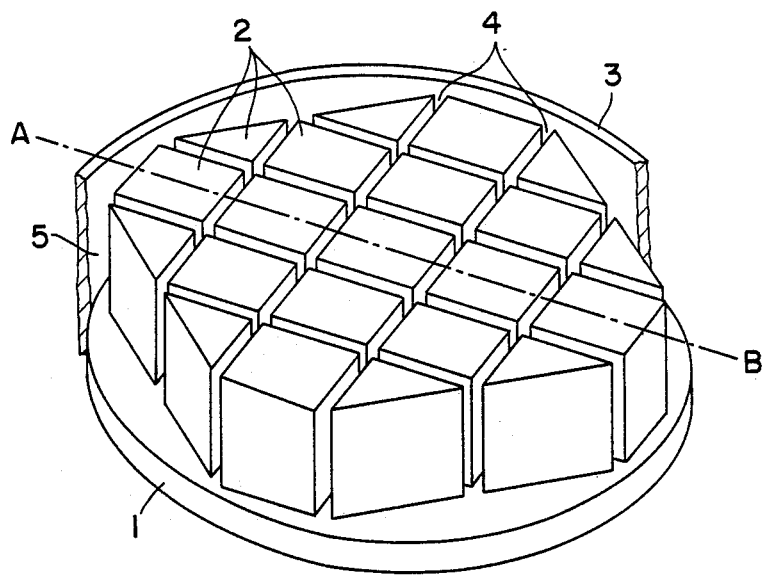
FIG. 1a illustrates the graphite molding bodies positioned on a plate of quartz material.
Figure 1B:
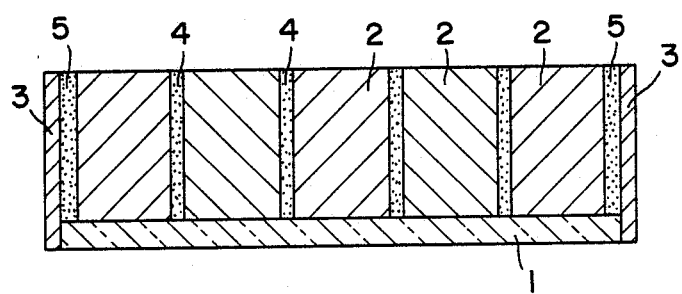
FIG. 1b is a section through the plate once the interstices have been filled with granulated quartz material.

With reference to FIGS. 1a and 1b, graphite molding bodies 2 are positioned at prescribed interstices on a cylindrical base that functions as a mirror plate or backing plate. Although molding bodies 2 are essentially square, they are truncated, into a triangle for example, at the edge of the assembly to conform with the roundness of base 1. Since molding bodies 2 are distributed at regular intervals, the interstices 4 between them are all equally wide. Base 1 is surrounded by a continuous wall 3 of graphite that extends in a hollow cylinder above the edge of the base. Only part of the wall is represented in FIG. 1a for the sake of clarity. Appropriate materials for base 1 are quartz glass and fused quartz.

A granulate of crystalline or amorphous quartz is introduced into the prepared mold illustrated in FIG. 1a in such a way that the space surrounded by graphite wall 3—the interstices 4 and 5 between the graphite molding bodies and between the molding bodies and the wall—is completely full. A granulate with a particle size of about 300 μm is preferable.

FIG. 1b is a vertical section along the line A-B in FIG. 1a. The graphite molding bodies positioned on the plate-shaped base 1 will be evident from the figure, with the interstices 4 between each pair of adjacent molding bodies 2 and the interstice 5 between wall 3 and its adjacent molding bodies 2 full of enough granulate that it extends from quartz-material base 1 to the upper edge of molding bodies 2. The upper edge of graphite wall 3 is on the same level as the upper edge of molding bodies 2, and the lower edge of wall 3 extends down to the bottom surface of base 1, securing it during the process.

The mold provided with granulated quartz in FIG. 1b is placed in a furnace that is evacuated and heated to a temperature above 1700° C., preferably to approximately 1730° C. Heating is continued for a period that depends on the size of the assembly and can last from 2 to 6 hours. In practice it takes from 3 to 4 hours for conventional pieces.

Figure 1C:
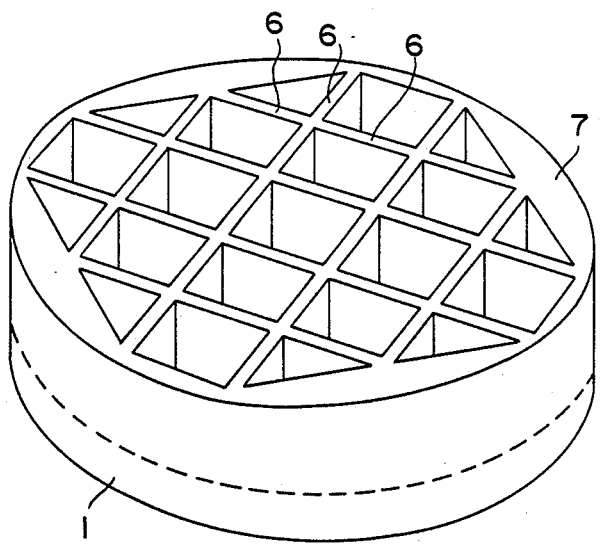
FIG. 1c illustrates a plate of quartz material and a supporting structure produced in accordance with the invention and fused into a unit.

After termination of heating the evacuated furnace is flooded with an inert gas, preferably nitrogen, at a temperature of approximately 20° C. The subsequent cooling period lasts up to 24 hours, depending again on the size of the assembly. Once the piece has cooled, graphite molding bodies 2 and graphite wall 3 are removed, leaving a piece as illustrated in FIG. 1c, which consists of plate-shaped base 1 of quartz material and of a supporting structure in the form of webs 6 and border 7. FIG. 1c illustrates a relatively simple shape with a grid-like supporting structure. Webs 6 derive from the granulate 4 packed between molding bodies 2, and border 7 from the granulate between graphite wall 3 and its adjacent molding bodies.

Depending on the particular level of stability demanded, it is also possible for the supporting structure to have another type of honeycomb pattern, with triangular or hexagonal cells for example.

Once the piece is finished it is possible to finish the mirror blank by positioning the necessary second plate—either the backing plate or the mirror plate—over webs 6 and border 7 and bonding it to the supporting structure by reheating. Once the blank has been created, it can be cut or ground to the desired planar or curved surface.

It is, however, also possible, to provide a curved base of quartz material, instead of a flat base with an appropriate supporting structure. In that case, graphite molding pieces that have been contoured at the upper and lower edge to conform with the curvature of the mirror are positioned as illustrated in FIG. 1. The assembly is again surrounded by a graphite wall and packed as illustrated in FIG. 1b. Bases that are comparatively thin can be reinforced with graphite molding bodies with an appropriately contoured surface on the side facing away from what will later be the supporting structure.

Figure 2:
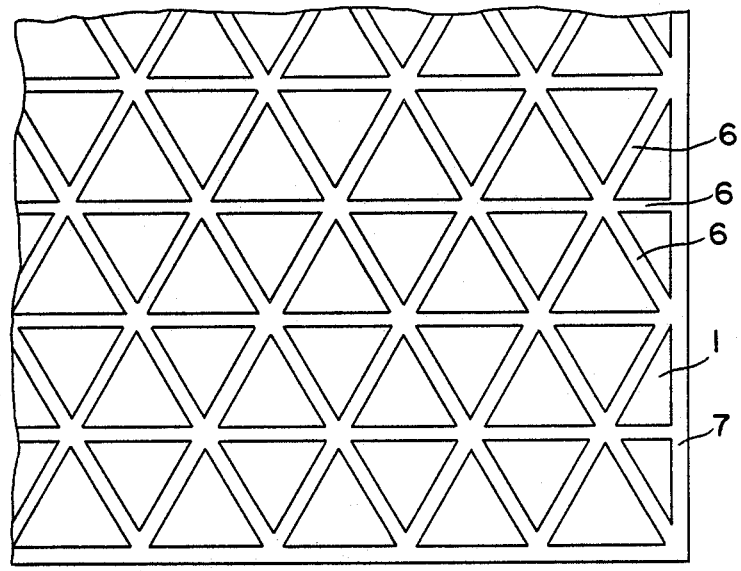
FIG. 2 is a detail of a square plate with triangular cells.

FIG. 2 is a detail of a square and plate-shaped base 1, with webs 6 that create triangular cells. It is manufactured similarly to the embodiment previously described herein, but surrounded by a square wall.

It will be appreciated that the instant specification and claims are set forth by way of illustration and not limitation, and that various modifications and changes may be made without departing from the spirit and scope of the present invention.

What is claimed is:

1. A method of manufacturing a light-weight mirror with a supporting structure having means defining cells and that is fastened securely to a mirror plate, wherein the materials selected for the supporting structure and for the mirror plate have practically the same coefficient of thermal expansion and wherein the method comprises manufacturing the supporting structure by positioning mutually separated graphite molding bodies directly on a base in the form of a plate, said plate being a mirror plate, surrounding the molding bodies with a wall of graphite, filing the interstices between the individual molding bodies and between the molding bodies and the wall with a granulate of crystalline or amorphous quartz to create part of the supporting structure, placing the resultant overall assembly in a furnace where the assembly is heated in a non-oxidizing atmosphere for 2 to 6 hours under a pressure of $2 \times 10^{-2}$ to 2 mbars at a temperature of 1710° C., to 1780° C. cooling the resulting bonded assembly within the furnace, and removing the graphite molding bodies once the assembly has cooled.

2. The method as in claim 1, wherein the assembly is heated to a temperature of 1720° to 1740° C.

3. The method as in claim 1, wherein pieces of graphite or graphite sheeting are employed for the molding bodies.

4. The method as in claim 1, wherein the granulate has a particle size of approximately 300 μm.

5. The method as in claim 1, wherein the furnace is flooded with an inert gas subsequent to the termination of heating.

6. The method as in claim 5, wherein the inert gas is nitrogen.

7. A method of manufacturing a blank for a light-weight mirror with a supporting structure having means defining cells and that is fastened securely to a backing plate, wherein the materials selected for the supporting structure and for the backing plate have practically the same coefficient of thermal expansion and wherein the method comprises manufacturing the supporting structure by positioning mutually separated graphite molding bodies directly on a base in the form of a plate, said plate being a backing plate, surrounding the molding bodies with a wall of graphite, filling the interstices between the individual molding bodies and between the molding bodies and the wall with a granulate of crystalline or amorphous quartz to create part of the supporting structure, placing the resultant overall assembly in a furnace where the assembly is heated in a non-oxidizing atmosphere for 2 to 6 hours under a pressure of $2 \times 10^{-2}$ to 2 mbars at a temperature of 1710° C. to 1780° C., cooling the resulting bonded assembly within the furnace, and removing the graphite molding bodies once the assembly has cooled.

8. A method for manufacturing a light-weight mirror comprising bonding a mirror plate to the backing plate of claim 7 by reheating the blank of claim 7.

* * * * *